United States Patent
Baldemair et al.

(10) Patent No.: US 12,500,703 B2
(45) Date of Patent: Dec. 16, 2025

(54) DAI AND HARQ CODEBOOK FOR MULTI-CELL SCHEDULING

(71) Applicant: Telefonaktiebolaget LM Ericsson (publ), Stockholm (SE)

(72) Inventors: Robert Baldemair, Solna (SE); Ravikiran Nory, San José, CA (US); Zhanxian Wang, Täby (SE); Ajit Nimbalker, Fremont, CA (US); Petter Ersbo, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 362 days.

(21) Appl. No.: 18/019,658

(22) PCT Filed: Aug. 6, 2021

(86) PCT No.: PCT/EP2021/072015
§ 371 (c)(1),
(2) Date: Feb. 3, 2023

(87) PCT Pub. No.: WO2022/029295
PCT Pub. Date: Feb. 10, 2022

(65) Prior Publication Data
US 2023/0291509 A1    Sep. 14, 2023

Related U.S. Application Data

(60) Provisional application No. 63/062,547, filed on Aug. 7, 2020.

(51) Int. Cl.
*H04L 1/1867* (2023.01)
*H04L 5/00* (2006.01)
(Continued)

(52) U.S. Cl.
CPC .......... *H04L 1/1887* (2013.01); *H04L 5/0035* (2013.01); *H04W 72/1273* (2013.01); *H04W 72/232* (2023.01)

(58) Field of Classification Search
CPC ... H04L 1/1825; H04L 1/1861; H04L 1/1887; H04L 1/1896; H04L 5/0035; H04L 2001/0092; H04W 72/1273; H04W 72/232
See application file for complete search history.

(56) References Cited

U.S. PATENT DOCUMENTS 10,512,072 B2 * 12/2019 Yi .................. H04W 72/23
11,102,771 B2 *  8/2021 Yi .................. H04W 72/0446
(Continued)

FOREIGN PATENT DOCUMENTS

CN    116325590 A  *  6/2023  ........... H04L 1/1896
KR    102076821 B1 *  5/2020  ........... H04L 5/0098
(Continued)

OTHER PUBLICATIONS

3GPP, "3GPP TS 38.213 V16.2.0", 3rd Generation Partnership Project; Technical Specification Group Radio Access Network; NR; Physical layer procedures for control (Release 16), Jun. 2020, 1-176.
(Continued)

*Primary Examiner* — Eric Nowlin
(74) *Attorney, Agent, or Firm* — Murphy, Bilak & Homiller, PLLC

(57) ABSTRACT

The present invention relates to the field of communication technology with regard to cell scheduling. A method of operating a network node comprises transmitting a single Downlink Control Information (DCI) to a radio node, the single DCI scheduling Physical Downlink Shared Channels (PDSCHs) on a plurality of cells. The single DCI indicates
(Continued)

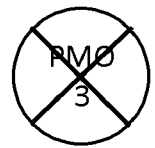

| C-DAI = 1 | C-DAI = 2 | C-DAI = 3 | C-DAI = 4 | C-DAI = 5 | C-DAI = 6 | C-DAI = 7 |
| C-DAI = 00 | C-DAI = 01 | C-DAI = 10 | C-DAI = 11 | C-DAI = 00 | C-DAI = 01 | C-DAI = 10 | a counter downlink assignment indicator (DAI) which is either based on the plurality of scheduled cells or independent of the plurality of cells scheduled by the single DCI.

14 Claims, 12 Drawing Sheets

(51) Int. Cl.
 *H04W 72/1273* (2023.01)
 *H04W 72/232* (2023.01)

(56) References Cited

U.S. PATENT DOCUMENTS

| | | | | |
|---|---|---|---|---|
| 11,177,909 | B2* | 11/2021 | Zhang | H04L 5/0035 |
| 11,706,781 | B2* | 7/2023 | Yi | H04W 72/23 |
| | | | | 370/329 |
| 12,028,854 | B2* | 7/2024 | Yang | H04W 72/1273 |
| 12,074,752 | B2* | 8/2024 | Wu | H04L 1/1861 |
| 12,137,002 | B2* | 11/2024 | Lei | H04L 5/0094 |
| 2018/0145796 | A1* | 5/2018 | Liang | H04L 1/1861 |
| 2018/0212717 | A1* | 7/2018 | Yang | H04L 1/1812 |
| 2019/0045489 | A1* | 2/2019 | He | H04L 1/1812 |
| 2019/0082431 | A1* | 3/2019 | Yi | H04L 5/0055 |
| 2020/0120650 | A1* | 4/2020 | Yi | H04L 5/0055 |
| 2020/0374045 | A1* | 11/2020 | Yin | H04B 7/0456 |
| 2021/0352638 | A1* | 11/2021 | Yi | H04W 72/542 |
| 2022/0078827 | A1* | 3/2022 | Zhang | H04L 5/0053 |
| 2022/0174707 | A1* | 6/2022 | Kim | H04W 72/23 |
| 2022/0201757 | A1* | 6/2022 | Cruz | H04L 1/1896 |
| 2022/0217756 | A1* | 7/2022 | Wu | H04L 1/1861 |
| 2022/0385411 | A1* | 12/2022 | Lei | H04L 1/1614 |
| 2023/0030642 | A1* | 2/2023 | Yuan | H04L 1/1822 |
| 2023/0224898 | A1* | 7/2023 | Ling | H04L 5/0044 |
| | | | | 370/329 |
| 2023/0291509 | A1* | 9/2023 | Baldemair | H04L 5/0035 |
| 2024/0267161 | A1* | 8/2024 | Xu | H04L 1/1854 |

FOREIGN PATENT DOCUMENTS

| | | | | |
|---|---|---|---|---|
| WO | WO-2019050379 | A1 * | 3/2019 | ........ H04W 72/0446 |
| WO | 2020141994 | A1 | 7/2020 | |
| WO | WO-2022029295 | A1 * | 2/2022 | ........... H04L 1/1896 |

OTHER PUBLICATIONS

Ericsson, "New WID on NR Dynamic spectrum sharing (DSS)", 3GPP TSG RAN Meeting #86, R3-193260, Sitges, Spain, Dec. 9-12, 2019, 1-4.

* cited by examiner

DAI AND HARQ CODEBOOK FOR MULTI-CELL SCHEDULING

TECHNICAL FIELD

The present invention relates to the field of communication technology. In particular, the present invention relates to a network node, a radio node, a method of operating the network node, and a method of operating the radio node in the field of cell scheduling.

BACKGROUND

Generally, carrier aggregation (CA) refers to the concept of a radio connection and/or communication link between a wireless and/or cellular communication network and/or network node and a terminal comprising a plurality of carriers for at least one direction of transmission (e.g. Downlink (DL) and/or Uplink (UL)), as well as to the aggregate of carriers.

A corresponding communication link may be referred to as carrier aggregated communication link or CA communication link. Carriers in a carrier aggregate may be referred to as component carriers (CC) or cells. In such a link, data may be transmitted over more than one of the carriers or cells and/or all the carriers or cells of the carrier aggregation (the aggregate of carriers).

Carrier aggregation may comprise one (or more) dedicated control carriers and/or primary carriers (which may e.g. be referred to as primary component carrier or PCC), over which control information may be transmitted, wherein the control information may refer to the primary carrier and/or other carriers. The other carriers may be referred to as secondary carriers (or secondary component carrier or secondary cell or SCC). However, in some approaches, control information may be sent over more than one carrier of an aggregate, e.g. one or more PCCs, or one PCC and one or more SCCs.

In carrier aggregation multiple component carriers (cells) may be configured for one radio node; a radio node is, for example, a user equipment (UE). Cells can be configured into so called Physical Uplink Control Channel (PUCCH) groups.

Acknowledgement signaling processes like Hybrid Automatic Repeat Request (HARQ) signaling are widely used in wireless communication technology (telecommunications) to facilitate low error rates when transferring data. The Acknowledgment signaling processes may determine correct or incorrect reception of UL or DL data, like Physical Downlink Shared Channel (PDSCH) and/or corresponding acknowledgement information, of a data block like a transport block (TB) based on coding bits associated to the data block. HARQ signaling may be referred to as HARQ feedback, wherein the HARQ feedback for all cells of a PUCCH group may be transmitted on the same UL using PUCCH or Uplink Control Information (UCI) on PUSCH. For the HARQ signaling, a HARQ codebook may be used which associates a bit pattern to acknowledgement signaling, e.g. by defining and/or indicating the bit pattern to be used for acknowledgment signaling. A HARQ codebook may also define and/or indicate the size and/or structure of the bit pattern.

The Acknowledgment and/or Not-Acknowledgment (ACK and/or NACK) bits which should be reported on a single PUCCH may be arranged into the HARQ signaling or HARQ codebook. For example, a UE reports HARQ-ACK and/or HARQ-NACK information for a corresponding PDSCH reception in a HARQ codebook (see Subclause 9.1.2 of 3GPP TS 38.213 V16.2.0 (2020 June)). HARQ-ACK information may be an ACK bit used in HARQ signaling to indicate a successful PDSCH reception. HARQ-NACK information may be a NACK bit used in HARQ signaling to indicate an erroneous PDSCH reception. A HARQ signaling or HARQ codebook can comprise ACK and/or NACK bits with regard to at least one scheduled carrier or cell and from one or multiple time instances. The ACK and/or NACK bits can be also referred to as HARQ bits or HARQ feedback bits which are inserted into the HARQ codebook.

The size of a semi-statically configured (fixed) HARQ codebook does not directly depend on the number of scheduled cells but on the number of configured cells. It can become unnecessarily large, especially when only few cells are scheduled.

Therefore, Long Term Evolution (LTE) and New Radio (NR) support a dynamic HARQ codebook. A UE can be configured with multiple Physical Downlink Control Channel (PDCCH) monitoring occasions to receive PDCCH scheduling for Physical Downlink Shared Channel (PDSCH) reception. PDCCH monitoring occasions may be first indexed across an increasing cell index (of the cell carrying the PDCCH) and then in increasing start time of the search space associated with the PDCCH monitoring occasion.

Downlink control information (DCI) may be transmitted on the PDCCH which is mainly used for scheduling decisions, required for reception of PDSCH, and/or for uplink scheduling grants enabling transmission on PUSCH. Scheduling decisions may be scheduling assignments for downlink and/or uplink, wherein, for example, the network node assigns certain time and frequency resources to UEs and informs the UEs about transmission formats to use. The DCI may include information for scheduling transport blocks (TBs) over communication slots, the TBs being associated with Hybrid Automatic Repeat Request (HARQ) process identifiers (IDs). The information for scheduling may include at least one of a PUCCH resource indicator, a counter Downlink Assignment Indicator (C-DAI) and total Downlink Assignment Indicator (T-DAI), and a HARQ process ID indicator. The PUCCH resource indicator may indicate at least one resource for a radio node (e.g. UE) to use for transmitting HARQ feedback related to the TBs and a value of the DAI may indicate the position of HARQ feedback related to the TBs in a HARQ codebook. The counter DAI may be represented with two bits in the DCI, for example, as defined in the Subclause 9.1.3 of 3GPP TS 38.213 V16.2.0 (2020 June). The HARQ process ID indicator may indicate HARQ process IDs.

In the dynamic HARQ codebook (Type 2 HARQ codebook), the UE reports HARQ feedback bit(s) for each scheduled PDSCH. In the HARQ signaling, e.g. HARQ codebook, PDSCH can be acknowledged for which a PDCCH has been received and/or semi-persistent PDSCH for which no PDCCH has been received.

However, when the UE misses a PDCCH scheduling a PDSCH, the UE does not expect to receive a PDSCH and thus does not report ACK and NACK bits for this PDSCH. Hence, the size (a total number of bits) of the HARQ codebook becomes incorrect and as well as the ordering of subsequent or future HARQ bits which are inserted in the HARQ codebook. To mitigate this error case of incorrect HARQ codebook size and incorrect ordering of subsequent HARQ bits, counter and total Downlink Assignment Indicator (DAI) values are inserted into a DCI scheduling a PDSCH, as described above.

In general, the counter DAI may be included in or indicated by each scheduling assignment (DCI), e.g. in addition to the total DAI. The counter DAI may represent a counter counting the current scheduling assignments. More specifically, the counter DAI may count the number of PDCCHs scheduling a PDSCH up to the current PDCCH cell and current PDCCH monitoring occasion, i.e. it is increased, for example, by a eNodeB (or Evolved Node B, eNB) or gNodeB (gNB) by one for each PDCCH scheduling a PDSCH.

The total DAI is the same for DCIs received in search spaces with the same starting time, i.e. it is set to the maximum counter DAI received in DCIs across search spaces with a same starting time. When a UE misses a PDCCH, it detects an interruption in the counter and total DAI values and can reconstruct from this interruption how many PDCCH scheduling a PDSCH reception it missed.

It should be noted that, in the prior art, the number of HARQ bits for each detected PDCCH inserted into the HARQ codebook must be the same, otherwise just determining that a PDCCH has been missed would not be sufficient. If the number of HARQ bits for each detected PDCCH inserted in the HARQ codebook is different, the UE will not know how many HARQ bits to insert into the codebook when missing a PDCCH scheduling a PDSCH.

This would again result in a wrongly sized HARQ codebook and incorrect order of bits in the HARQ codebook. Thus, in the prior art, the number of HARQ bits inserted for each PDCCH is the same for one HARQ codebook.

The size of an entry of the HARQ signaling, e.g. the HARQ codebook, comprising the HARQ bits for a detected PDCCH is given by the maximum number of HARQ bits a scheduled PDSCH can require, i.e. it depends on the Multiple Input Multiple Output (MIMO) configuration (one or two TBs) and/or the Code Block Group (CBG) configuration of the configured cells (or active Bandwidth Part (BWP) of configured cells) of the PUCCH group.

To save DCI overhead, the counter and total DAI are typically expressed with a few bits, e.g. 2 bits, and a larger DAI value is just wrapped around by performing modulo operations.

This can lead to error cases when a UE misses many contiguous PDCCH, but this is accepted since it reduces DCI overhead.

FIG. 1 shows an example how the counter DAI (C-DAI) is conventionally increased for each scheduled PDCCH monitoring occasion (PMO). FIG. 1 shows seven icons (round circles), each icon representing one PMO (PMO 0 to PMO 6), wherein the two rows below the icons show the C-DAI values assigned to the PDCCHs (included in respective DCIs) scheduled in the respective PMOs. The top first row shows the C-DAI values as integers, while the subsequent lower row shows the C-DAI value with 2 bits using a mod-4 wrap around. In the example of FIG. 1, the icons of PMO 2, PMO 3, and PMO 4 are crossed out which indicates that the downlink data on the PDCCHs, i.e. the DCIs on the PDCCHs, that should have been received by the UE in PMO 2, PMO 3, and PMO 4 were not detected by the UE. However, even though the UE has missed the DCIs in PMOs 2 to 4, the UE is still able to determine that it has missed 3 DCIs (i.e. 3 scheduled PDSCHs) from inspecting the last C-DAI before interruption (PMO 1, C-DAI=2, 01) and the first C-DAI after interruption (PMO 5, C-DAI=6, 01). In binary notation, both C-DAIs are the same, so the UE can determine that it must have missed 3 DCIs. Due to the mod-4 wrap around, it is possible that the UE has missed more than 3 DCIs, i.e. 3+n*4 DCIs without being able to determine that, but this is usually very unlikely.

For each DCI, either received or determined as missed, the UE inserts a fixed-size entry into the HARQ codebook, for example one or two bits, depending on the TB configuration, the fixed-size entries representing a fixed number of HARQ feedback bits for each entry. For example, if the PDSCH is configured with one TB, one bit is inserted as fixed-size entry for each DCI. However, if, for example, at least one PDSCH is configured with up to two TBs, two bits are inserted as fixed-size entry. If a DCI only schedules a single TB, the second bit in the fixed-size entry comprising two bits is set to a fixed value, e.g. NACK. For example, per missed DCI, NACK-bit(s) are inserted into the HARQ codebook as fixed-size entries, wherein either one or two NACK-bits are inserted depending on the TB configuration.

SUMMARY OF INVENTION

It may be an object of the invention provide measures which may enable providing correct HARQ feedback indications with correct HARQ feedback indication sizes and ordering in case a single DCI schedules PDSCHs on a plurality of cells.

According to an aspect, a method of operating a network node comprises transmitting a single Downlink Control Information (DCI) to a radio node. The single DCI schedules Physical Downlink Shared Channels (PDSCHs) on a plurality of cells and the single DCI indicates a counter downlink assignment indicator (DAI) based on the plurality of scheduled cells.

According to another aspect, a method of operating a network node comprises transmitting a single DCI to a radio node. The single DCI schedules PDSCHs on a plurality of cells and indicates a counter DAI, the counter DAI being independent on the plurality of cells scheduled by the single DCI.

According to another aspect, a method of operating a radio node comprises receiving a single DCI scheduling PDSCHs on a plurality of cells. The single DCI indicates a counter DAI based on the plurality of scheduled cells. Furthermore, the method of operating the radio comprises transmitting a HARQ feedback indication based on the plurality of cells.

According to another aspect, a method of operating a radio node comprises receiving a single DCI scheduling PDSCHs on a plurality of cells. The single DCI indicates a counter DAI.

Furthermore, the method of operating the radio node comprises transmitting a HARQ feedback indication. An entry size of the HARQ feedback indication is a maximum number of HARQ bits that need to be sent in response to the single DCI.

According to another aspect, a network node comprises a processor and a memory containing instructions executable by the processor to transmit a single DCI to a radio node. The single DCI schedules PDSCHs on a plurality of cells and the single DCI indicates a counter DAI based on the plurality of scheduled cells.

According to another aspect, a network node comprises a processor and a memory containing instructions executable by the processor to transmit a single DCI to a radio node. The single DCI schedules PDSCHs on a plurality of cells and indicates a counter DAI. The counter DAI is independent on the plurality of cells scheduled by the single DCI.

According to another aspect, a radio node comprises a processor and a memory, said memory containing instructions executable by said processor. Said radio node is operative to receive a single DCI scheduling PDSCHs on a plurality of cells. The single DCI indicates a counter DAI based on the plurality of scheduled cells. Furthermore, said radio node is operative to transmit a HARQ feedback indication based on the plurality of cells.

According to another aspect, a radio node comprises a processor and a memory, said memory containing instructions executable by said processor. Said radio node is operative to receive a single DCI scheduling PDSCHs on a plurality of cells. The single DCI indicates a counter DAI. Furthermore, said radio is operative to transmit a HARQ feedback indication, and an entry size of the HARQ feedback indication is a maximum number of HARQ bits that need to be sent in response to the single DCI.

DETAILED DESCRIPTION

When a single DCI schedules PDSCH on multiple component carriers or cells, problems may occur regarding correct HARQ feedback indication. For example, when a single DCI schedules PDSCHs on a plurality of cells, but the mechanisms regarding missed DCIs as described with regard to FIG. 1 are used, problems regarding an incorrect HARQ feedback indication size and ordering may occur.

Figure 1:
FIG. 1 shows an example how the counter DAI (C-DAI) is increased for each PDCCH monitoring occasion (PMO) in the prior art.
Figure 2:
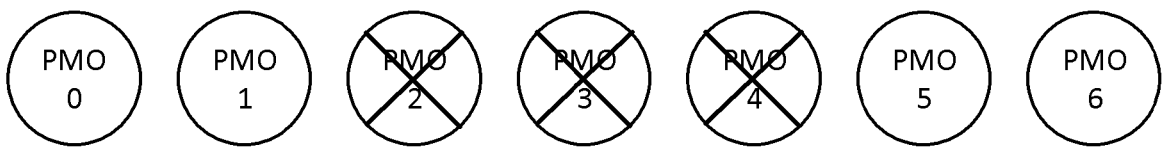
FIG. 2 shows a modified example of FIG. 1 with a single DCI scheduling PDSCHs on two cells.

This problem is shown in FIG. 2 which represents a similar example as FIG. 1. In FIG. 2, however, the single DCI of PMO 3 schedules PDSCHs on two cells. Based on the received conventional C-DAIs, the UE would determine that it has missed three DCIs and would thus insert solely three fixed-size entries into the HARQ codebook (for example, either three or six NACK-bits as fixed-size entries, depending on the TB configuration). However, the UE should insert four fixed-size entries into the HARQ codebook since the UE has not missed three DCIs scheduling three PDSCHs but three DCIs scheduling four PDSCHs (in FIG. 2, the DCI of PMO 3 schedules two PDSCHs). By solely inserting three fixed-size entries, a HARQ codebook with a wrong size or length is obtained and errors in the ordering of subsequent HARQ feedback bits inserted into the HARQ codebook may occur.

Thus, there is a need for providing correct HARQ feedback indications with correct HARQ feedback indication sizes and ordering in case a single DCI schedules PDSCHs on a plurality of cells.

In addition, up until now no agreement between a network node (like a base station, an eNB, gNB, or the like) and a radio node (like a user equipment (UE), user terminal, or the like) exists to agree on a common ordering of HARQ feedback bits associated to PDSCHs on multiple cells or carriers scheduled by a single DCI. Such an agreement on a common ordering does not yet exist, since up until now a single DCI could only schedule a PDSCH on one cell or carrier.

The mechanism(s) described above and in more detail below solve technical problems that arise when a dynamic HARQ codebook is used together with a single DCI scheduling multiple cells (also referred to as multi-PDSCH DCI in the following). Being able to use a dynamic HARQ codebook is advantageous since it leads to lower overhead compared to a semi-statically configured HARQ codebook.

As explained above, problems occur when a single DCI schedules a respective PDSCH on a plurality of cells. While an additional DAI counter may be provided, such an additional DAI counter would disadvantageously lead to an increase of scheduling information. Instead, a core aspect described below is to either modify the counting of the C-DAI or to modify the entry size for a DCI scheduling PDSCH(s) in the dynamic HARQ codebook. Solutions how to order the HARQ feedback bits in the HARQ codebook when a single DCI schedules PDSCH(s) on a plurality of cells are also detailed below.

In the following, any exemplary type of wireless communication network, cellular wireless communication network, or the like is regarded, wherein the communication network may comprise at least one network node and at least one radio node.

Figure 3:
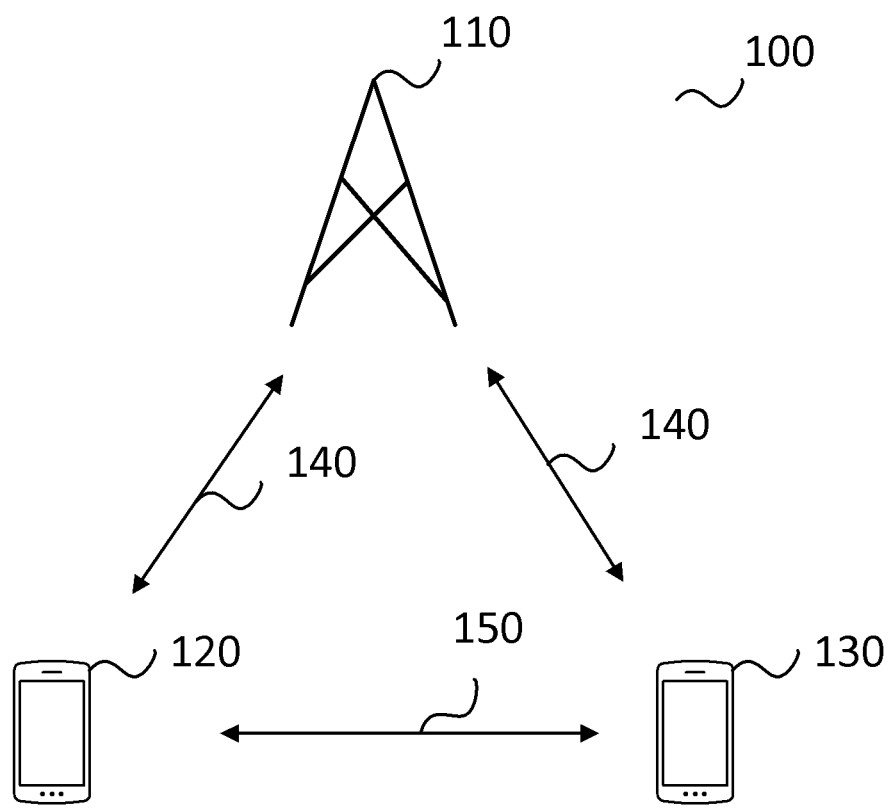
FIG. 3 shows an example of a wireless communication network.

FIG. 3 shows an example of a wireless communication network 100 comprising one network node 110, a radio node 120, and a radio node 130. A network node and a radio node may generally be considered a device or node adapted for wireless and/or radio (and/or microwave) frequency communication, and/or for communication utilizing an air interface, e.g. according to a communication standard. The network node 110 may be any kind of network device or radio node of a wireless communication network, such as a base station and/or eNodeB (eNB) and/or gNodeB (gNB) and/or relay node and/or micro or nano or pico or femto node and/or other node.

The radio nodes 120 and 130 may represent an end device or terminal device for communication utilizing the wireless communication network, and/or be implemented as a user equipment (UE) according to a communication standard such as LTE, NR or the like. Examples of UEs may comprise a phone such as a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal device may be mobile or stationary.

The network node 110 is able to send any kind of Downlink (DL) data to the radio nodes 120 and 130 via communication links 140 and the radio nodes 120 and 130 are able to send any kind of Uplink (UL) data to the network node 110 via communication links 140 (such as LTE, NR or the like). Furthermore, the radio nodes 120 and 130 may exchange data between each other using sidelink signaling via communication link 150 (such as Bluetooth, Wi-Fi or the like).

The exemplary wireless communication network 100 of FIG. 3 comprises one network node and two radio nodes. This is, however, not limiting and the wireless communication network 100 may comprise more or less network nodes and radio nodes.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto.

Signaling may generally comprise one or more signals and/or one or more symbols. Control information or a control information message or corresponding signaling (control signaling) may be transmitted on a control channel, e.g. a physical control channel, which may be a downlink channel or a sidelink channel, e.g. one UE scheduling another UE. For example, control information and allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a radio node, e.g. UE, on a PUCCH (Physical Uplink Control Channel) and/or PUSCH (Physical Uplink Shared Channel) and/or a HARQ-specific channel. Multiple channels may be applied for multi-component or multi-carrier indication or signaling.

Figure 4:
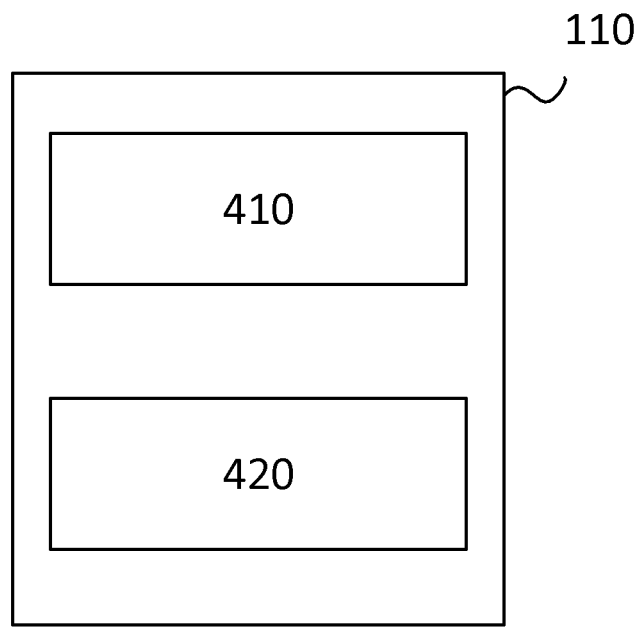
FIG. 4 shows an exemplary configuration for a network node.

FIG. 4 shows an exemplary configuration for the network node 110. The network node 110 may comprise a processor 410 and a memory 420. The processor 410 may be a processing circuitry (which may also be referred to as control circuitry) which may comprise a controller connected to the memory 420. Any module of the network node 110, e.g. a communication module or determining module, may be implemented in and/or executable by, the processing circuitry 410, in particular as module in the controller.

The network node 110 may also comprise radio circuitry (not shown) providing receiving and transmitting or transceiving functionality, e.g. one or more transmitters and/or receivers and/or transceivers, wherein the radio circuitry is connected or connectable to the processing circuitry 410.

An antenna circuitry (not shown) of the network node 110 may be connected or connectable to the radio circuitry to collect or send and/or amplify signals. The network node 110 may be adapted to carry out any of the methods for operating the network node disclosed herein; in particular, it may comprise corresponding circuitry, e.g. processing circuitry, and/or modules.

Figure 5:
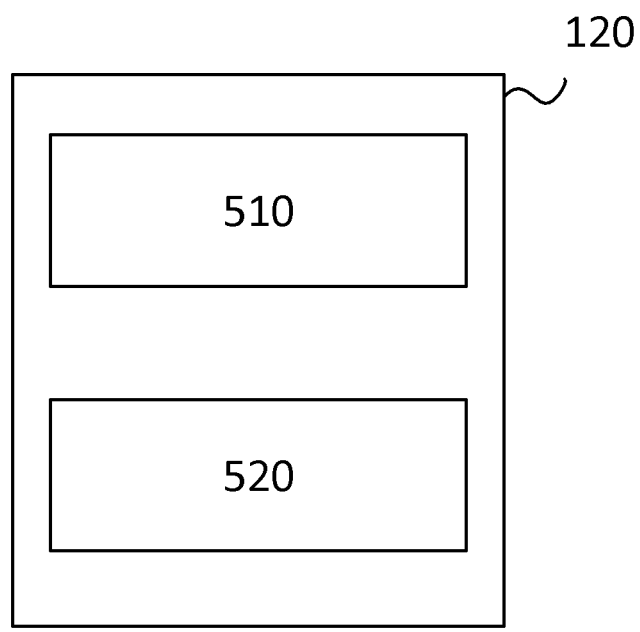
FIG. 5 shows an exemplary configuration for a radio node.

FIG. 5 shows an exemplary configuration for the radio node 120. The configuration for the radio node 130 is the same as for radio node 120 and a detailed description about the configuration for the radio node 130 is here omitted for conciseness reasons. The radio node 120 may comprise a processor 510 and a memory 520. The processor 510 may be a processing circuitry (which may also be referred to as control circuitry) which may comprise a controller connected to the memory 520. Any module of the radio node 120, e.g. a communication module or determining module, may be implemented in and/or executable by, the processing circuitry 510, in particular as module in the controller.

The radio node 120 may also comprise radio circuitry (not shown) providing receiving and transmitting or transceiving functionality, e.g. one or more transmitters and/or receivers and/or transceivers, wherein the radio circuitry is connected or connectable to the processing circuitry 510.

An antenna circuitry (not shown) of the radio node 120 may be connected or connectable to the radio circuitry to collect or send and/or amplify signals. The radio node 120 may be adapted to carry out any of the methods for operating the radio node disclosed herein; in particular, it may comprise corresponding circuitry, e.g. processing circuitry, and/or modules.

There is generally considered a computer program product comprising instructions adapted for causing processing and/or control circuitry to carry out and/or control any method described herein, in particular when executed on the processing and/or control circuitry. Also, there is considered a carrier medium arrangement carrying and/or storing a computer program product as described herein.

A carrier medium arrangement may comprise one or more carrier media. Generally, a carrier medium may be accessible and/or readable and/or receivable by processing or control circuitry. Storing data and/or a computer program product and/or code may be seen as part of carrying data and/or a program product and/or code. A carrier medium generally may comprise a guiding or transporting medium and/or a storage medium. A guiding or transporting medium may be adapted to carry and/or store signals, in particular electromagnetic signals and/or electric signals and/or magnetic signals and/or optical signals. A carrier medium, in particular a guiding or transporting medium, may be adapted to guide such signals to carry them. A carrier medium, in particular a guiding or transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Figure 6:
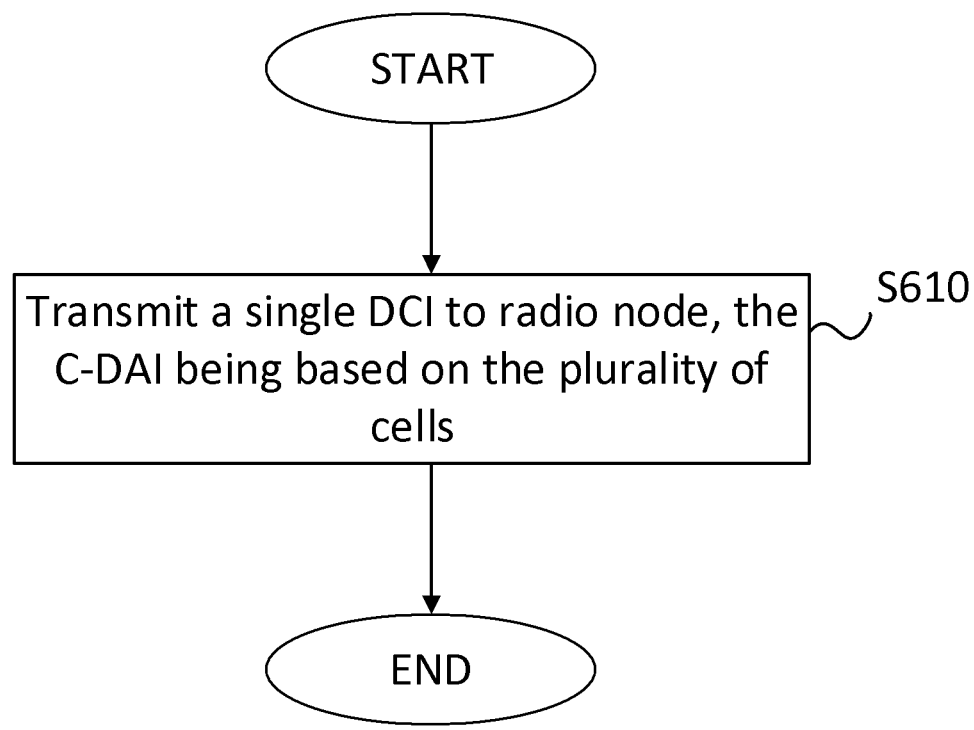
FIG. 6 shows a method of operating a network node according to an embodiment.

FIG. 6 shows a method of operating the network node 110 according to an embodiment. The method of operating the network node 110 comprises transmitting (S610) a single DCI to the radio node 120. The single DCI schedules PDSCHs on a plurality of cells (multi-PDSCH DCI) and the single DCI includes or indicates a counter DAI (C-DAI) based on the plurality of scheduled cells. For example, the single DCI includes a DAI bit-field that indicates a C-DAI value. The network node 110 may schedule PDSCHs on a plurality of cells for the concept of carrier aggregation.

Here, the multi-PDSCH DCI may include scheduling information (e.g. time and frequency resource assignments) with regard to two or more PDSCHs, as well as the DAI counters (as described below).

Figure 7:
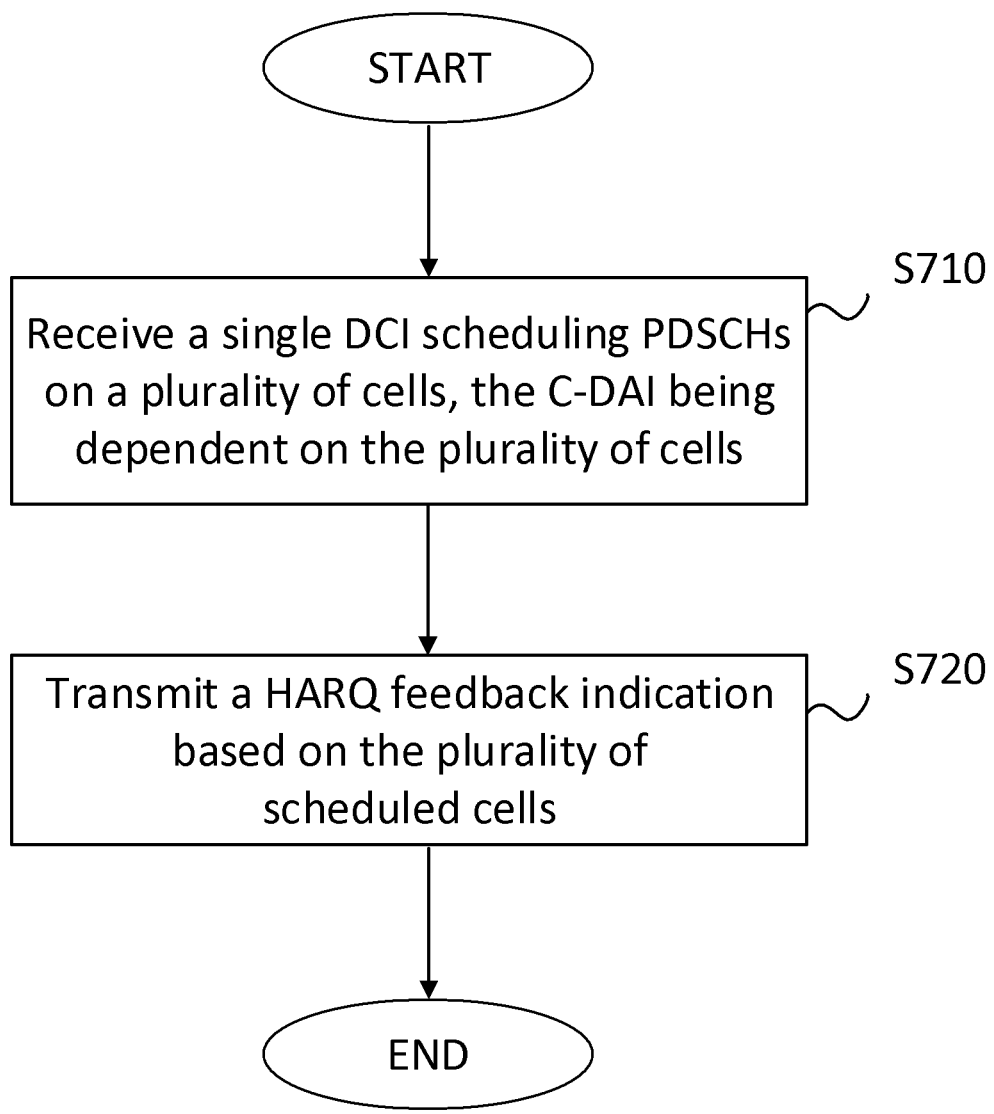
FIG. 7 shows a method for operating a radio node according to an embodiment.

For the radio node 120, FIG. 7 shows a corresponding method for operating the radio node 120 according to an embodiment.

The method of operating the radio node 120 may comprise receiving (S710) a single DCI scheduling PDSCHs on a plurality of cells. The single DCI may include or indicate a C-DAI based on the plurality of scheduled cells. For example, the radio node 120 receives the single DCI scheduling the PDSCHs on the plurality of cells from the network node 110 during a PDCCH monitoring occasion.

It should be noted that the radio node 120 can be also served with more than one DCI, e.g. with DCIs each scheduling only one cell (also referred to as legacy single PDSCH DCI in the following) and/or DCIs each scheduling a plurality of cells as described above.

The method of operating the radio node 120 may further comprise transmitting (S720) a HARQ feedback indication based on the plurality of cells. The radio node 120 may transmit the HARQ feedback indication, such as a HARQ codebook, to the network node 110, wherein the HARQ feedback indication indicates whether or not the radio node 120 has successfully received the PDSCHs scheduled on the plurality of cells.

As will be described in greater detail in some embodiments below, the number and/or size and/or order of HARQ feedback bits to be inserted into the HARQ feedback indication may depend on a number of scheduled PDSCHs in the single DCI.

In addition, as will be described in greater detail in other embodiments below, the number and/or size and/or order of HARQ feedback bits to be inserted into the HARQ feedback indication may depend on the C-DAI or may depend on the C-DAI and T-DAI.

The single DCI described above may further include or indicate a total DAI (T-DAI) based on the plurality of scheduled cells. For example, the single DCI includes a DAI bit-field that indicates a T-DAI value.

According to an embodiment, the C-DAI and the T-DAI may depend on a number of cells scheduled by the single DCI.

This means that the C-DAI and the T-DAI may reflect on how many cells PDSCHs have been scheduled. For example, when an interruption in the C-DAI and the T-DAI occurs because the radio node 120 has missed at least one DCI, the radio node 120 can determine from the C-DAI and the T-DAI on how many cells PDSCHs have been scheduled by the missed DCI. In other words, the radio node 120 is configured to determine a number of missed PDSCHs based on at least the counter DAI.

More specifically, the radio node 120 is configured to determine a number of missed PDSCHs based on the C-DAI and the T-DAI. Hence, in an embodiment, the number of missed PDSCHs is based on at least the counter DAI, specifically based on the C-DAI and the T-DAI. When knowing the number of missed PDSCHs, the radio node 120 is able to report a HARQ feedback indication with correct HARQ feedback indication size and ordering to the network node 110.

As already explained above, the C-DAI may represent a counter based on the current scheduling assignment. More specifically, the C-DAI may count the number of PDSCHs scheduled in a single DCI, e.g. up to the current PDCCH cell and current PDCCH monitoring occasion, i.e. it is increased, for example, by the network node 110 by one for each PDSCH scheduled in the DCIs (multi-PDSCH DCI and single PDSCH DCI).

The T-DAI is the same for DCIs received in search spaces with the same starting time, i.e. it is set to the maximum counter DAI received in DCIs across search spaces with a same starting time.

Figure 8:
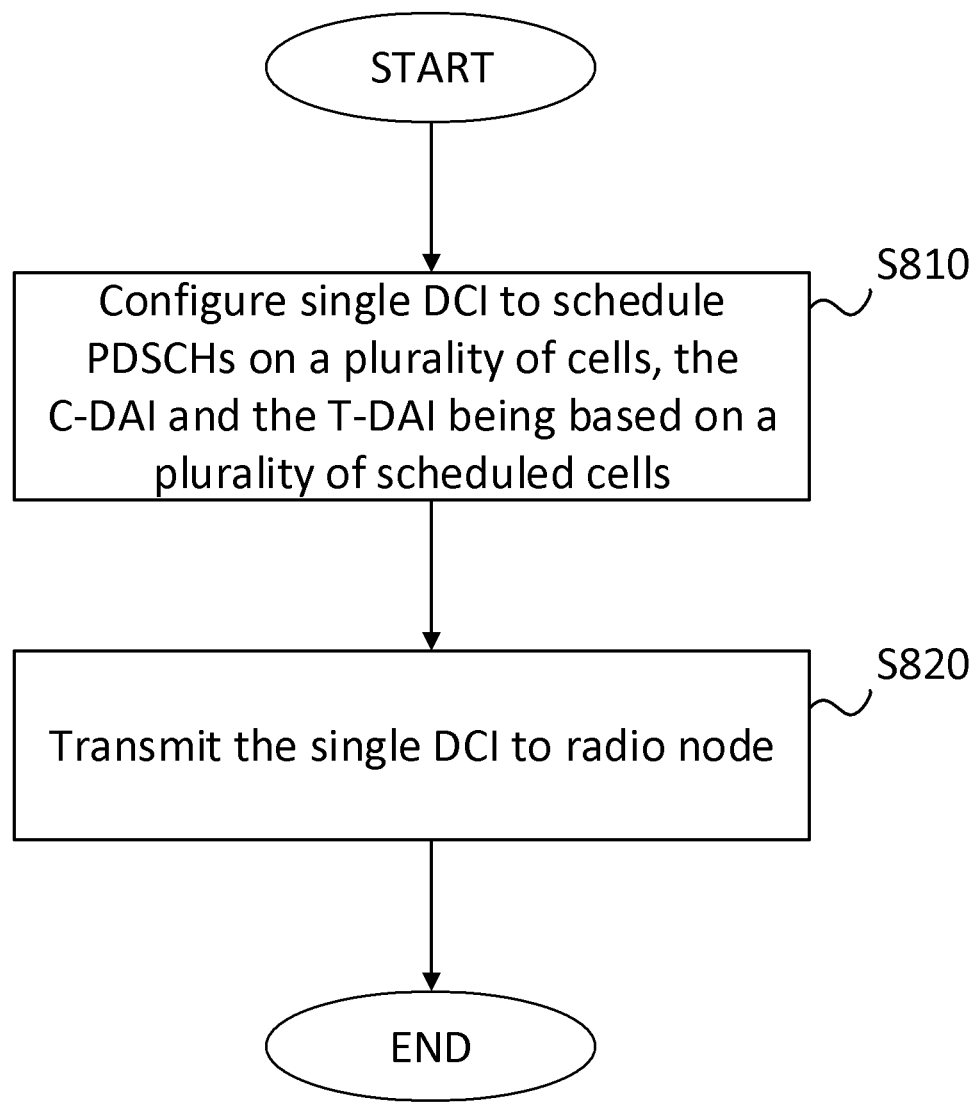
FIG. 8 shows a method of operating a network node according to another embodiment.

FIG. 8 shows a further method of operating the network node 110 according to another embodiment. The method shown in FIG. 8 comprises configuring (S810) a single DCI to schedule PDSCHs on a plurality of cells, the single DCI including or indicating a C-DAI and a T-DAI based on the plurality of scheduled cells. The method further comprises transmitting (S820) the single DCI to the radio node 120.

According to an embodiment, the C-DAI is not increased by one for each scheduled PDCCH, but by the number of cells scheduled by the single DCI contained in the PDCCH, as will be described below.

Figure 9:
FIG. 9 shows an example how the counter DAI (C-DAI) is increased for each PDCCH monitoring occasion (PMO) according to an embodiment.

FIG. 9 shows an example how the C-DAI is increased for each PDCCH monitoring occasion (PMO) according to an embodiment. FIG. 9 shows the same scenario as FIG. 2, but in FIG. 9 the C-DAIs are increased by the number of scheduled cells.

This can be seen for PMO 3, where a PDSCH is not scheduled only on one cell but on two cells by a single DCI. Therefore, for PMO 3 the C-DAI is increased from 3 to 5 (instead of from 3 to 4 as it would be done in the prior art). If the C-DAI is expressed as an integer number, the radio node 120 can determine from C-DAIs received in PMO 1 and PMO 5 that it has missed 4 PDSCHs. Thus, the radio node 120 is able to correctly determine the number of PDSCHs which have been missed and thus can correctly report the HARQ codebook with a correct size and order (of HARQ bits).

Here, in order to determine that the C-DAI sequence 3-5 is indeed due to a single DCI scheduling 2 PDSCH cells (and not due to a missed DCI (including a C-DAI having the value 4, as indicated in FIG. 1 above), the radio node may be configured to determine the number of missing PDSCHs by further determining whether the single DCI (including the C-DAI of value 5) also includes scheduling information for more than one cell.

As shown in FIG. 9, increasing the C-DAI may include incrementing the DAI by the number of cells scheduled by the single DCI and performing a modulo operation on the incremented C-DAI. It is also possible to further perform a modulo operation on the T-DAI. By performing a modulo operation on the C-DAI and/or the T-DAI, the DCI overhead can be reduced.

However, if the C-DAI is expressed as 2-bit value, as shown in the second row of FIG. 9, the radio node 120 can only detect up to two missed DCIs scheduling PDSCHs on three cells in total due to the modulo operation performed on the C-DCI.

By contrast, for three consecutive missed DCIs scheduling PDSCHs on four cells in total, the radio node 120 would not be able to correctly determine the number of missed PDSCHs and thus cannot correctly report a HARQ codebook with the correct size and ordering.

Thus, to further increase the robustness against consecutively missed DCIs, the number of bits of a DAI bitfield for the C-DAI and the T-DAI can be changed.

According to an embodiment, the C-DAI, total T-DAI, or a combined C-DAI and T-DAI are represented by a DAI bitfield, wherein the number of bits of the DAI bitfield for the C-DAI, the T-DAI, or the combined counter DAI and T-DAI depends on a number of cells scheduled by the single DCI. This means that the C-DAI, total T-DAI, or a combined C-DAI and T-DAI may be represented by a DAI bitfield, wherein the number of bits of the DAI bitfield for the C-DAI, the T-DAI, or the combined counter DAI and T-DAI depends on whether the single DCI scheduling PDSCHs on a plurality of cells is configured. For example, the C-DAI and the T-DAI may be defined as a single DAI bitfield or the C-DAI may be defined as one DAI bitfield and the T-DAI may be defined as another DAI bitfield.

As shown in FIG. 9, since the step size or increment for the C-DAI can be larger than one due to PDSCHs scheduled on more than one cell, this can lead to a quicker wrap-around of the C-DAI. Thus, it may be advantageous to increase the number of bits of the C-DAI bitfield.

For example, it is advantageous to increase the number of bits of the C-DAI bitfield depending on the number of cells scheduled by PDSCH. This means that the number of bits of the C-DAI bitfield may be increased when the single DCI scheduling PDSCHs on a plurality of cells is configured.

Thus, increasing the C-DAI bitfield may depend on whether or not the single DCI scheduling PDSCHs on multiple cells is configured. For example, it is advantageous to increase the number of bits of the C-DAI bitfield to more than two bits, e.g. three bits, when a single DCI scheduling PDSCHs on multiple cells, i.e. a multi-PDSCH DCI instead of a single-PDSCH DCI, is configured (associated with the PUCCH group) (see third row of FIG. 9). By using three bits, the error with three consecutively missed DCIs can be resolved by the radio node 120. In fact, due to the modulo operation, up to $2^k-1$ consecutively missed PDSCH can be resolved, k indicating the number of bits in the bitfield. The radio node 120 does not know if the missed DCIs have scheduled PDSCHs on one or a plurality of cells, however, based on the C-DAIs, it knows how many scheduled PDSCHs are missed. Since, for example, in the dynamic HARQ codebook for each PDSCH (received or determined as missed) the same amount of bits is inserted, the size and order of the HARQ codebook can be correctly reconstructed.

Also, the number of bits of the T-DAI bitfield may be increased accordingly, such that the radio node 120 knows how many scheduled PDSCHs are missed based on the C-DAIs and the T-DAIs.

In some embodiments, the radio node 120 may be configured to receive a first DCI in a first PDCCH DCI format (legacy single PDSCH DCI). The first DCI indicates a PDSCH scheduling assignment for only one serving cell. The radio node 120 may further be configured to receive a second DCI in a second PDCCH DCI format (multi-PDSCHS DCI), the second DCI indicating PDSCH scheduling assignments for multiple serving cells (e.g. two cells). The second DCI may be the single DCI described in some embodiments above. In these embodiments, the method of operating the network node 110 may then comprise transmitting the first DCI in the first PDCCH DCI format. The first DCI indicates the PDSCH scheduling assignment for only one cell. The method may further comprise transmitting the second DCI in the second PDCCH DCI format, wherein the second DCI is the single DCI.

If it is desired to improve the robustness for consecutively missed DCIs (as discussed above with reference to FIG. 9) and a higher number of bits for the C-DAI bitfield is used for the second PDCCH DCI format, then the number of bits of the C-DAI bitfield in the first DCI can also be increased to match the number of bits of the C-DAI bitfield in the second DCI. For example, if the radio node 120 is configured to monitor only the first PDCCH DCI format, the number of bits of the C-DAI bitfield for the first PDCCH DCI format can be two bits. If the radio node 120 is configured to monitor and/or receive both the first PDCCH DCI format and the second PDCCH DCI format, the number of bits of the C-DAI bitfields in the first DCI and the second DCI are matched, i.e. are equal. The same can also apply to the number of bits of the T-DAI bitfields such that the number of bits of the T-DAI bitfields in the first DCI and the second DCI are matched. In this example, the number of DAI bitfield bits in both the first PDCCH DCI format and the second PDCCH DCI format can then be increased to e.g. three bits. This can apply for the case where both the first and second PDCCH DCI formats are monitored on the same serving cell.

This can also apply for the case where the first PDCCH DCI format is monitored on a first serving cell and the second PDCCH DCI format is monitored on a second serving cell different from the first serving cell.

In another embodiment, the number of bits of the C-DAI bitfield and the T-DAI bitfield in the first PDCCH DCI format is increased only if the first PDCCH DCI format is configured to be monitored in a UE-specific PDCCH search space (SS), for example when the first PDCCH DCI format is a DCI format 1-1 in the field of New Radio (NR).

According to another embodiment, if, however, the first PDCCH DCI format is configured to be monitored in a common PDCCH search space (e.g. the first PDCCH DCI format is DCI format 1-0 configured for type0, type1, type2, type3 common search space monitoring in the field of NR), then the number of bits of the DAI bitfield in the first PDCCH DCI format is kept unchanged regardless of whether the radio node 120 is configured to monitor the second PDCCH DCI format or not.

If the radio node 120 is scheduled in a same PUCCH group with a plurality of DCIs including DAIs (C-DAI and/or T-DAI) being represented by a different number of DAI bitfield bits, the modulus in a performed modulo operation for decreasing the DCI overhead may be based on the DAI bitfield with the largest number of bits. For example, if the radio node 120 is scheduled with DCIs including DAIs of two and three DAI bitfield bits, the modulus will be $2^3=8$. In the DAI bitfield having two bits as the number of bits, only a fraction of the DAI bitfield having three bits as the number of bits is conveyed, e.g. the two least significant bits (LSB).

In order to ensure proper HARQ feedback bit insertion into the HARQ feedback indication, such as the HARQ codebook, when a single DCI schedules PDSCHs on a plurality of cells, a pre-defined order may be used in the HARQ feedback indication to insert the HARQ feedback bits for the PDSCHs on the plurality of cells scheduled in the single DCI.

Figure 10A:
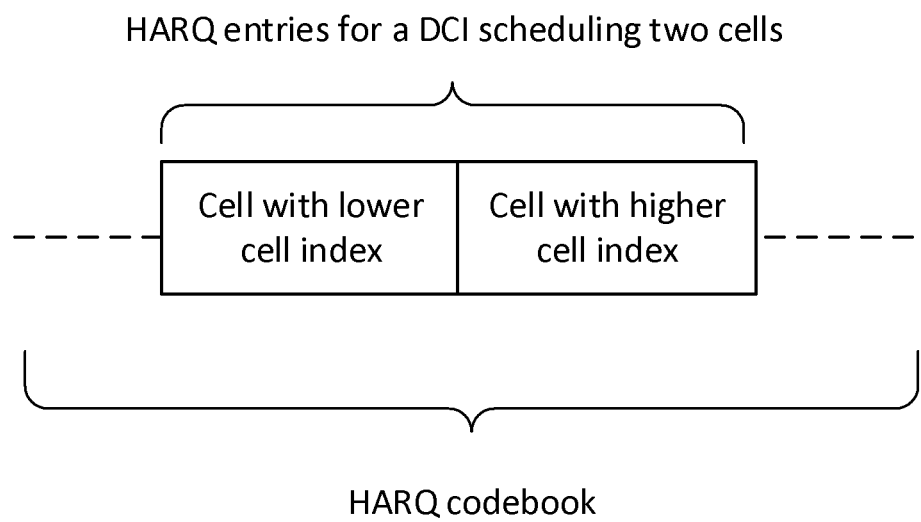
FIGS. 10A to 10C show examples for pre-defined ordering of HARQ entries in a HARQ codebook.
Figure 10B:
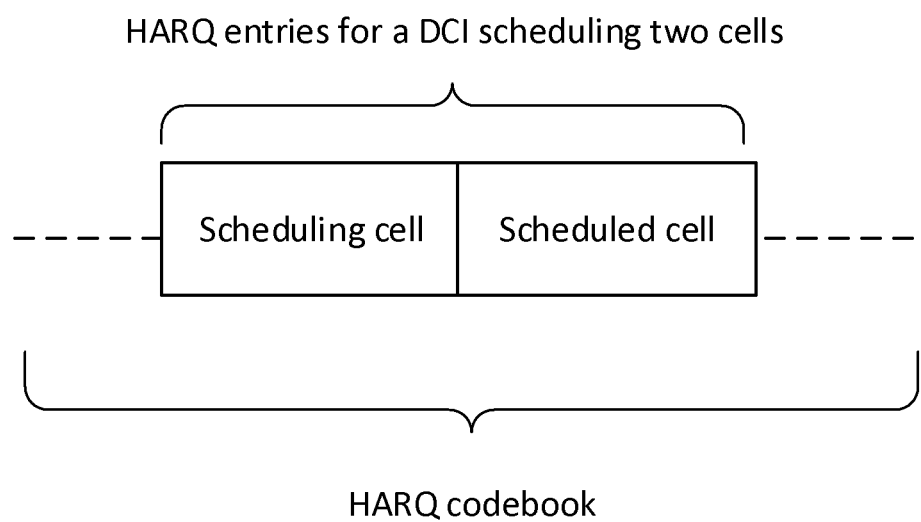
Figure 10C:
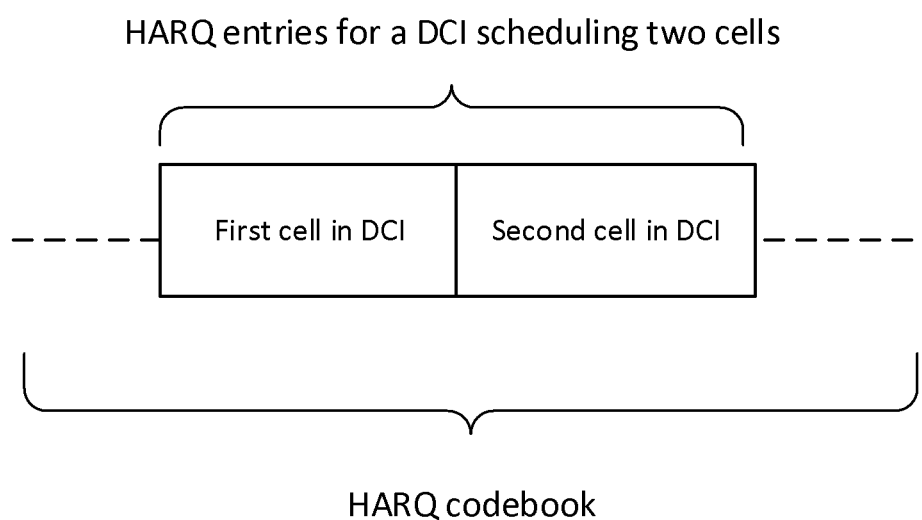

FIGS. 10A to 10C show examples for pre-defined ordering of the HARQ entries in the HARQ codebook, the HARQ entries being for a DCI scheduling two cells. The HARQ entries comprise the HARQ feedback bits for the PDSCHs being scheduled on two cells.

As shown in FIG. 10A, an ordering of the HARQ feedback bits in the HARQ codebook may be done based on cell index, wherein the HARQ feedback bits of the cell with lower cell index are inserted before the HARQ feedback bits of the cell with higher cell index.

As shown in FIG. 10B, an ordering of the HARQ feedback bits in the HARQ codebook may be also done based on the scheduling cell and the scheduled cell. Here, the scheduling cell is the cell carrying the PDCCH. When the ordering is based on the scheduling cell and the scheduled cell, the HARQ feedback bits of the scheduling cell are inserted before the HARQ feedback bits of the scheduled cell.

As further shown in FIG. 10C, an ordering of the HARQ feedback bits in the HARQ codebook may be done based on the ordering in the scheduling DCI. For example, the HARQ feedback bits for the first cell in the scheduling DCI is inserted before the HARQ feedback bits for the second cell in the scheduling DCI, the first cell in the scheduling DCI occurring before the second cell in the scheduling DCI.

According to another embodiment, the C-DAI and T-DAI may not be changed based on the plurality of cells even though a single DCI can schedule PDSCHs on a plurality of cells. In other words, according to this alternative concept, the conventional DAI counting remains unchanged even if a plurality of cells may be scheduled in a single DCI. In order to still be able to provide a correct HARQ feedback indication, e.g. a HARQ codebook, a number of HARQ feedback bits with regard to each DCI is set to a maximum number of HARQ bits that need to be sent in response to a maximum number of cells scheduled by the multi-PDSCH DCI. For example, if during a sequence of PMOs there is a first multi-PDSCH DCI scheduling 2 cells and a second multi-PDSCH DCI scheduling 3 cells, then the maximum number of HARQ bits for all DCIs of the sequence of PMOs is set to the number of HARQ bits necessary for 3 cells. In this regard, FIG. 11 shows the corresponding method of operating the network node 110 according to another embodiment.

Figure 11:
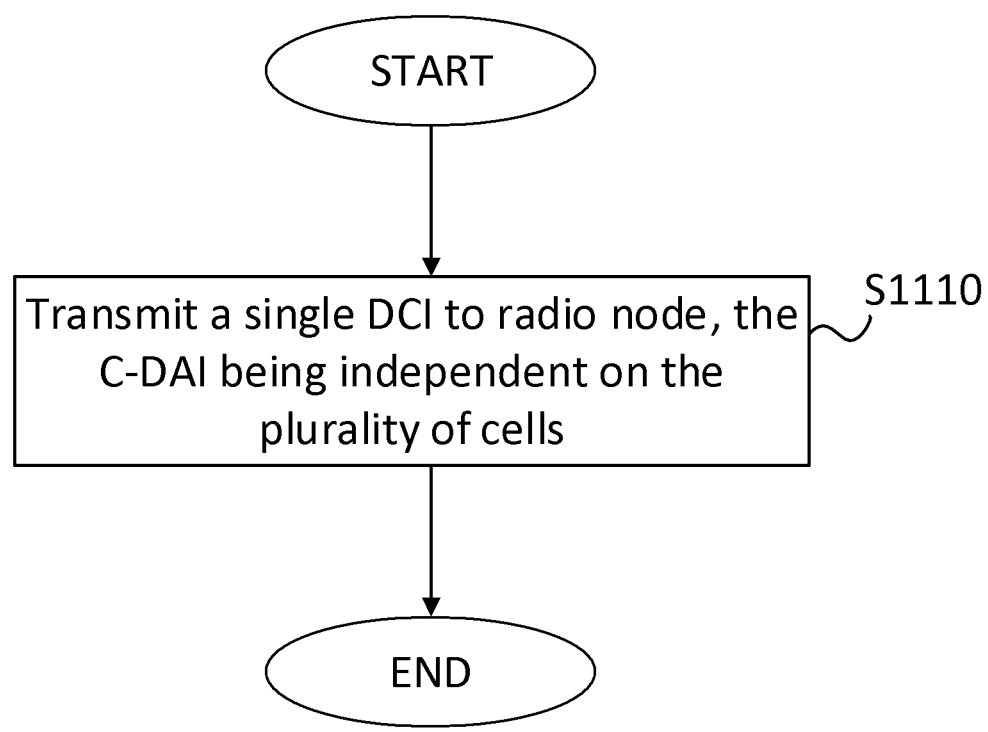
FIG. 11 shows a method of operating a network node according to another embodiment.

As shown in FIG. 11, the method comprises transmitting (S1110) a single DCI to the radio node 120, the single DCI scheduling PDSCHs on a plurality of cells and including or indicating a C-DAI, the C-DAI being independent on the plurality of cells scheduled by the single DCI.

Again, the single DCI may also further include or indicate a T-DAI, but according to another embodiment the T-DAI may be independent on the plurality of cells scheduled by the single DCI.

In this embodiment, counting of the C-DAI and T-DAI is not changed, i.e. it is the PDCCH counting described in FIG. 1.

However, in order to ensure a proper HARQ feedback indication using, for example, a HARQ codebook, a maximum number of HARQ feedback bits that needs to be sent in response to a DCI may be inserted into the HARQ feedback indication for each entry corresponding to a DCI (received or determined as missed).

For example, instead of one or two bits (depending on TB configuration), a maximum number of n*(1 or 2 bits) may be inserted for each DCI (received or determined as missed) as entry in the HARQ codebook, wherein n is the maximum number of cells a single DCI can schedule or configure (in a PMO sequence). For example, a typical value for n would be two.

The 1 or 2 bits may be determined if at least one cell across the aggregated cells (or active BWP thereof) (and part of the same PUCCH group) is configured with one or two TBs.

Thus, according to an embodiment, the network node 110 may receive a HARQ feedback indication, for example, a HARQ codebook, an entry size of the HARQ feedback indication being the maximum number of HARQ bits that need to be received in response to the single DCI. The maximum number of HARQ bits for each entry of the HARQ codebook that need to be received in response to the single DCI may be determined by regarding the DCIs across configured PDCCH monitoring occasions. For example, the maximum number of HARQ bits used for an entry of the HARQ codebook may be equal to the maximum number of cells a single DCI can configure across all PDCCH monitoring occasions. For example, when again referring to the exemplary situation shown in FIG. 9, the single DCI received in PMO 3 can configure two cells. Thus, the maximum number of cells a single DCI can configure across all PMOs 0 to 6 is two and the maximum number of HARQ bits used for an entry of the HARQ codebook is also two. Even though the DCIs in the remaining PMOs each only schedule one cell, the entry size of the HARQ feedback indication for each entry is two bits.

Figure 12:
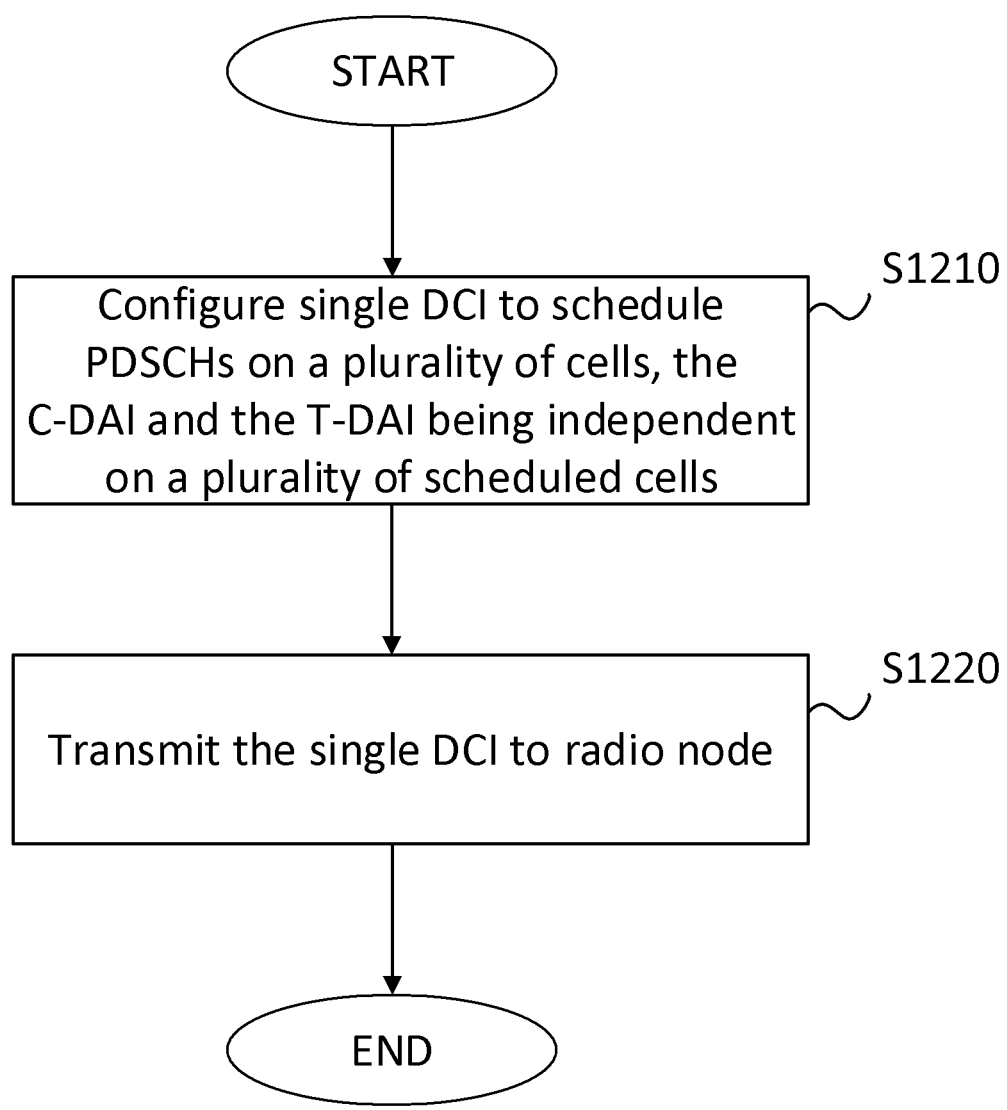
FIG. 12 shows a method of operating a network node according to another embodiment.

FIG. 12 shows a method of operating the network node 110 according to another embodiment. The method may comprise configuring (S1210) a single DCI to schedule PDSCHs on a plurality of cells, wherein the C-DAI and the T-DAI are independent on a plurality of scheduled cells. The method may further comprise transmitting (S1220) the single DCI to the radio node 120.

Figure 13:
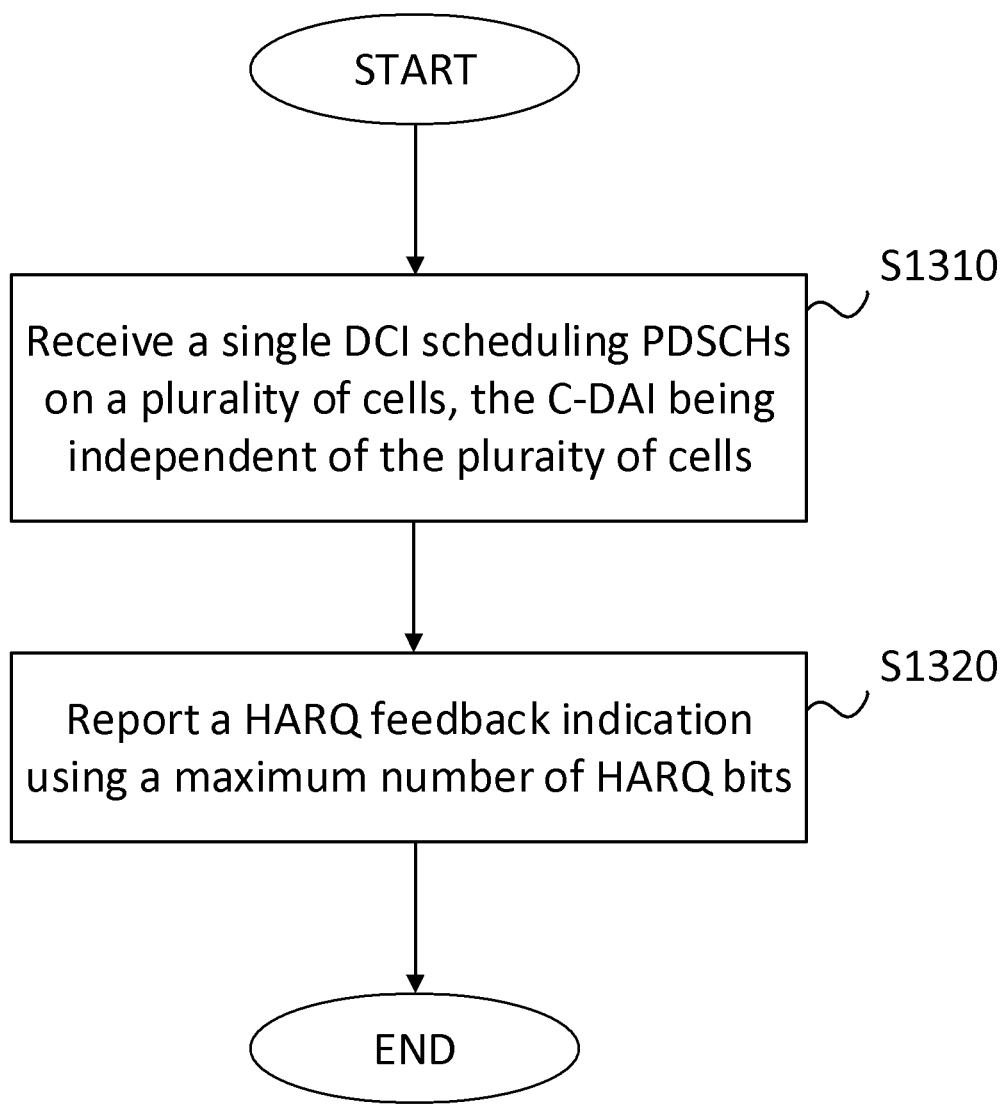
FIG. 13 shows a method of operating a radio node according to another embodiment.

For the radio node 120, FIG. 13 shows the corresponding method of operating the radio node 120. As shown in FIG. 13, the method comprises receiving (S1310) a single DCI scheduling PDSCHs on a plurality of cells, the single DCI including or indicating a C-DAI. The radio node 120 may receive the single DCI from the network node 110. The C-DAI may be independent of the plurality of cells scheduled by the single DCI.

The method further comprises transmitting (S1320) a HARQ feedback indication, an entry size of the HARQ feedback indication being a maximum number of HARQ bits that need to be sent in response to the single DCI. The radio node 120 may send the HARQ feedback indication, for example, a HARQ codebook, to the network node 110 to indicate successful or non-successful reception of PDSCHs on a plurality of cells scheduled by DCIs.

Again, as also explained above with regard to the method of operating the network node 110, the single DCI may further include or indicate a T-DAI. For example, the T-DAI is independent of the plurality of cells scheduled by the single DCI.

In order to ensure proper HARQ feedback indication even though the C-DAI and the T-DAI are independent of the plurality of cells, the method of operating the radio node 120 may further comprise inserting the maximum number of HARQ bits in the HARQ feedback indication for each entry corresponding to the plurality of DCIs irrespective of the number of cells scheduled in the respective DCIs. In other words, a maximum number of HARQ bits may be inserted for each entry into the HARQ codebook irrespective of the actual number of cells that need to be scheduled in each DCI.

For example, the maximum number of HARQ bits inserted into the HARQ feedback indication for each entry may be determined by a largest number of cells configured by at least one DCI across a plurality of PDCCH monitoring occasions. This leads to a HARQ feedback indication with entries having the maximum number of HARQ bits available for each DCI, irrespective of whether each DCI schedules one cell or a plurality of cells.

If, however, a DCI schedules less cells than the largest number of cells being able to be configured by at least one DCI across the plurality of PDCCH monitoring occasions or a DCI currently schedules fewer cells than the largest number of cells, fixed value HARQ bits may be inserted for the unused bits of the maximum number of HARQ bits. For example, if HARQ feedback sent in response to a DCI requires fewer HARQ bits than the maximum number of HARQ bits (because not the maximum number of available cells is scheduled and/or not all TBs are scheduled), the unused bits are set to fixed value, typically NACK.

When a single DCI only schedules one cell even though the DCI may be able to schedule multiple cells, the HARQ feedback for the scheduled cell may be inserted in a fixed position of the HARQ entry for this DCI, like in the beginning or end of the HARQ entry. Alternatively, for ordering the HARQ bits in the HARQ feedback indication, also one of the embodiments shown in FIGS. 10A to 10C can be used. As described above, the unused HARQ bits of the HARQ entry can be set to a fixed value, typically NACK.

When a single DCI actually schedules multiple cells (multi-PDSCH DCI), the embodiments shown in FIGS. 10A to 10C may be again used for ordering the HARQ feedback and constructing the HARQ entry for this DCI in the HARQ feedback indication, like the HARQ codebook.

As described above, by inserting a maximum number of HARQ bits into the HARQ feedback indication as entries depending on the number of cells that can be scheduled by the DCIs across a plurality of PDCCH monitoring occasions ensures proper HARQ feedback indication even though the counting of the C-DAI and the T-DAI is not changed depending on the number of scheduled cells. However, one drawback of this mechanism is that it can substantially increase the HARQ codebook size.

Thus, according to a further embodiment, the method of operating the network node 110 may further comprise transmitting a first DCI of a first DCI group, the first DCI scheduling only a single cell, and a second DCI of a second DCI group, the second DCI being the single DCI.

In other words, the cells to be scheduled may be grouped into a first group where the configured PDCCH, or more exactly the DCI carried by the PDCCH, can only schedule PDSCHs on a single cell, and a second group where the configured PDCCH, or more exactly the DCI carried by the PDCCH, can schedule PDSCHs on a plurality of cells.

The corresponding method of operating the radio node 120 may thus comprise receiving the first DCI of the first DCI group, the first DCI scheduling only a single cell, and receiving the second DCI of the second DCI group, the second DCI being the single DCI that schedules a plurality of cells. In order to decrease the HARQ feedback indication size, e.g. the HARQ codebook size, by decreasing the number of HARQ bits inserted into the HARQ feedback indication, the HARQ feedback indication includes a first sub HARQ feedback indication for the first DCI group and a second sub HARQ feedback indication for the second DCI group.

By creating sub HARQ feedback indications, e.g. sub HARQ codebooks, the complete HARQ feedback indication comprising both sub HARQ feedback indications, the above described mechanism regarding the maximum number of bits may be only applied to the second DCI group. In other words, the maximum number of HARQ bits determined as described above may be inserted only for the second DCI group. The number of HARQ bits for the entries in the HARQ feedback indication for the first DCI group is kept unchanged. This leads to a reduced HARQ codebook size since larger HARQ codebook entries are only needed for PDCCH cells where at least one configured DCI can schedule more than one cell.

In order to further reduce the HARQ codebook size, according to another embodiment, the radio node 120 may receive a first DCI of a first DCI group, a second DCI of a second DCI group, and a third DCI of a third DCI group. The first DCI schedules only a single cell, the second DCI is configured for or schedules, respectively, a plurality of cells, in particular a first number of cells, and the third DCI also is configured for or schedules, respectively, a plurality of cells, in particular a second number of cells. The second DCI may be the single DCI. The third DCI may be the single DCI. In other words, there are three DCIs. The first number of configured cells or scheduled cells, respectively, is different from the second number of configured cells or scheduled cells, respectively. In this regard, a first sub HARQ feedback indication is for the first DCI group, a second sub HARQ feedback indication is for the second DCI group, and a third sub HARQ feedback indication is for the third DCI group.

For example, if the radio node 120 is configured by using a first DCI carried by the PDCCH that schedules only a single cell, a second DCI that schedules n1 cells (n1>1), and a third DCI that can schedule n2 cells (n2>1, with n1≠n2), the first, second, and third DCIs carried by the PDCCHs, three sub HARQ feedback indications, e.g. three sub HARQ codebooks are generated. These three sub HARQ feedback indications create the complete HARQ feedback indication. In this regard, a first maximum number of HARQ bits is inserted only for the second DCI group and a second maximum number of HARQ bits is inserted only for the third DCI group. Thus, the above described mechanisms are applied independently to each DCI group with 1 or 2 bits for the first DCI group, n1*(1 or 2) bits for the second DCI group, and n2*(1 or 2) bits for the third DCI group. Again, the 1 or 2 bits may be determined if at least one cell across the aggregated cells (or active BWP thereof) (and part of the same PUCCH group) is configured with one or two TBs.

By dividing the HARQ feedback indication into three sub groups, the HARQ feedback size can be further decreased.

As mentioned above, the network node 110 as well as the radio nodes 110 and 120 may perform certain operations or processes described herein using the circuitry discussed with regard to FIGS. 4 and 5 above. These operations may be performed in response to the processing circuitry or processor executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code.

The software instructions may be read into the main memory for another computer-readable medium, such as a storage device or from another device via the communication interface.

Further, the software instructions contained in the main memory may cause processing circuitry including a data processor, when executed on processing circuitry, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations and steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements, modules, units of the network node 110 as well as the radio nodes 120 and 130 may be distributed in different software and hardware components or other devices for bringing about the intended function. A plurality of distinct elements and modules may also be gathered for providing the intended functionality. For example, the elements, modules, and functions of the nodes may be realized by a microprocessor and a memory similar to the above node including a bus, a processing unit, a main memory, ROM, etc.

The microprocessor may be programmed such that the above-mentioned operations, which may be stored as instructions in the memory, are carried out.

Further, the elements, modules, and units of the apparatus may be implemented in hardware, software, Field Programmable Gate Arrays (FPGAs), application-specific integrated circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The invention claimed is:

1. A method of operating a radio node, the method comprising:
   receiving a single Downlink Control Information, DCI, scheduling Physical Downlink Shared Channels, PDSCHs, on a plurality of cells, the single DCI indicating a counter downlink assignment indicator, DAI;
   transmitting a Hybrid Automatic Repeat Request, HARQ, feedback indication, an entry size of the HARQ feedback indication being a maximum number of HARQ bits that need to be sent in response to the single DCI; and
   receiving a first DCI of a first DCI group, a second DCI of a second DCI group, and a third DCI of a third DCI group, the first DCI scheduling only a single cell, the second DCI being the single DCI and scheduling a first number of cells, and the third DCI being the single DCI and scheduling a second number of cells, the first number of scheduled cells being different from the second number of scheduled cells, wherein a first sub HARQ feedback indication is for the first DCI group and a second sub HARQ feedback indication is for the second DCI group and a third sub HARQ feedback indication is for the third DCI group.

2. The method of claim 1, wherein the single DCI further indicates a total DAI.

3. The method of claim 1, further comprising:
   inserting a maximum number of HARQ bits in the HARQ feedback indication for each entry corresponding to a plurality of DCIs irrespective of the number of cells scheduled in the respective DCIs.

4. The method of claim 1, further comprising:
   inserting a maximum number of HARQ bits in the HARQ feedback indication for each entry corresponding to a plurality of DCIs, the maximum number of bits being determined by a largest number of cells configured by at least one DCI across a plurality of PDCCH monitoring occasions.

5. The method of claim 1, further comprising:
   inserting HARQ bits in the HARQ feedback indication in response to a DCI that schedules only one cell and further inserting fixed value HARQ bits for unused bits of the maximum number of HARQ bits.

6. The method of claim 1, wherein
   a first maximum number of HARQ bits is inserted only for the second DCI group and a second maximum number of HARQ bits is inserted only for the third DCI group.

7. The method of claim 1,
   wherein a pre-defined order is used in the HARQ feedback indication to insert HARQ feedback bits for the PDSCHs on the plurality of cells scheduled in the single DCI.

8. The method of claim 7,
   wherein an ordering of the HARQ feedback bits in a HARQ codebook is done based on cell index.

9. The method of claim 8,
   wherein the HARQ feedback bits of a cell with lower cell index are inserted before the HARQ feedback bits of a cell with higher cell index.

10. The method of claim 7,
    wherein an ordering of the HARQ feedback bits in a HARQ codebook is done based on a scheduling cell and a scheduled cell, wherein the scheduling cell is a cell carrying the PDCCH.

11. The method of claim 10,
    wherein the HARQ feedback bits of the scheduling cell are inserted before the HARQ feedback bits of the scheduled cell.

12. The method of claim 7,
    wherein an ordering of the HARQ feedback bits in a HARQ codebook is done based on an ordering in a scheduling DCI.

13. The method of claim 12,
    wherein the HARQ feedback bits for a first cell in the scheduling DCI is inserted before the HARQ feedback bits for a second cell in the scheduling DCI, the first cell in the scheduling DCI occurring before the second cell in the scheduling DCI.

14. A radio node, comprising a processor and a memory, said memory containing instructions executable by said processor, whereby said radio node is operative to:
    receive a single Downlink Control Information, DCI, scheduling Physical Downlink Shared Channels, PDSCHs, on a plurality of cells, the single DCI indicating a counter downlink assignment indicator, DAI;
    transmit a Hybrid Automatic Repeat Request, HARQ, feedback indication, an entry size of the HARQ feedback indication being a maximum number of HARQ bits that need to be sent in response to the single DCI; and
    receive a first DCI of a first DCI group, a second DCI of a second DCI group, and a third DCI of a third DCI group, the first DCI scheduling only a single cell, the second DCI being the single DCI and scheduling a first number of cells, and the third DCI being the single DCI and scheduling a second number of cells, the first number of scheduled cells being different from the second number of scheduled cells, wherein a first sub HARQ feedback indication is for the first DCI group and a second sub HARQ feedback indication is for the second DCI group and a third sub HARQ feedback indication is for the third DCI group.

* * * * *